(12) United States Patent
Willis, II

(10) Patent No.: US 7,185,478 B1
(45) Date of Patent: Mar. 6, 2007

(54) AUTOMATED LAWN CUTTING AND VACUUM SYSTEM

(76) Inventor: Hulen J. Willis, II, 152 Willowdale Dr. Apt. #11, Frederick, MD (US) 21702

( * ) Notice: Subject to any disclaimer, the term of this patent is extended or adjusted under 35 U.S.C. 154(b) by 0 days.

(21) Appl. No.: 11/119,434

(22) Filed: Apr. 28, 2005

(51) Int. Cl.
*A01B 69/00* (2006.01)
*A01B 79/00* (2006.01)

(52) U.S. Cl. .................................................. 56/10.2 A

(58) Field of Classification Search ............. 56/10.2 A, 56/11.9; 701/23, 22, 24; 180/167, 168; 700/245
See application file for complete search history.

(56) References Cited

U.S. PATENT DOCUMENTS

| | | | |
|---|---|---|---|
| 3,203,500 A * | 8/1965 | Gaberson et al. ........... 180/168 |
| 3,550,714 A * | 12/1970 | Bellinger .................... 180/168 |
| 4,463,821 A * | 8/1984 | Falamak ..................... 180/168 |
| 4,964,265 A * | 10/1990 | Young ......................... 56/10.8 |
| 5,163,273 A * | 11/1992 | Wojtkowski et al. ........ 56/11.9 |
| 5,323,593 A * | 6/1994 | Cline et al. .............. 56/10.2 A |
| 5,507,137 A * | 4/1996 | Norris ..................... 56/10.2 J |
| 5,572,856 A * | 11/1996 | Ku .......................... 56/10.2 A |
| 5,974,347 A * | 10/1999 | Nelson ......................... 701/22 |
| 6,604,348 B2 * | 8/2003 | Hunt .......................... 56/10.6 |
| 6,611,738 B2 * | 8/2003 | Ruffner ....................... 701/23 |
| 2001/0047231 A1 * | 11/2001 | Peless et al. ................. 701/23 |

\* cited by examiner

*Primary Examiner*—Árpád Fábián Kovács

(57) ABSTRACT

An automated lawn cutting and vacuum system is disclosed. The system includes an automated lawnmower comprising a mower housing. A control panel provided on the mower housing automatically controls the mowing, driving and steering functions of the automated lawnmower.

19 Claims, 6 Drawing Sheets

US 7,185,478 B1

AUTOMATED LAWN CUTTING AND VACUUM SYSTEM

FIELD OF THE INVENTION

The present invention relates to lawnmowers and lawn-mowing accessories. More particularly, the present invention relates to an automated lawn cutting and vacuum system having an automated lawnmower and a mower home base enclosure in which the lawnmower is kept when not in use for re-charging of the mower and in which grass clippings are removed from the mower.

BACKGROUND OF THE INVENTION

A variety of different types of lawnmowers are known in the art for mowing grass on residential and business lawns. One of the most common types of lawnmowers includes a gas-powered or electric-powered engine which is mounted on a mower housing and drives a blade or blades inside the mower housing. A mower handle extends from the mower housing to enable a user to push the mower on the lawn as the rotating blade cuts the grass.

On some types of mowers, a hand-actuated propulsion handle is provided on the mower handle to facilitate self-propulsion of the mower. Still another common type of lawnmower is the riding lawnmower which is characterized by a mower housing fitted with pneumatic wheels and a seat with propulsion controls mounted on the mower housing. A user sits on the seat and drives the mower forward or backwards to cut grass on a lawn.

Conventional push-type, self-propelled and riding lawnmowers suffer from the disadvantage of requiring an operator to maintain direct control over the mowing and propulsion functions of the mower. This often requires that the mower operator stand or sit for long periods of time in the sun on hot days. Furthermore, the cut grass clippings are either blown from the mower housing onto the yard as mulch or collected in a collection bag which is removably attached to the lawnmower and must be emptied after the mowing operation. Therefore, an automated lawn cutting and vacuum system having an automatic lawnmower is needed to facilitate the automatic cutting of a lawn as well as the automatic removal of grass clippings from the lawnmower after a mowing operation.

SUMMARY OF THE INVENTION

The present invention is generally directed to an automated lawn cutting and vacuum system. The system includes an automated lawnmower typically having a storage bin for receiving grass clippings. A control panel provided on the mower housing automatically controls the mowing, driving and steering functions of the automated lawnmower. The system may further include a mower home base enclosure in which the automated lawnmower is stored when not in use and in which grass clippings are removed from the storage bin of the lawnmower. Solar power may be used to re-charge the automated lawnmower for a subsequent mowing operation.

BRIEF DESCRIPTION OF THE DRAWINGS

The invention will now be described, by way of example, with reference to the accompanying drawings, in which.

DETAILED DESCRIPTION OF THE INVENTION

Figure 1:
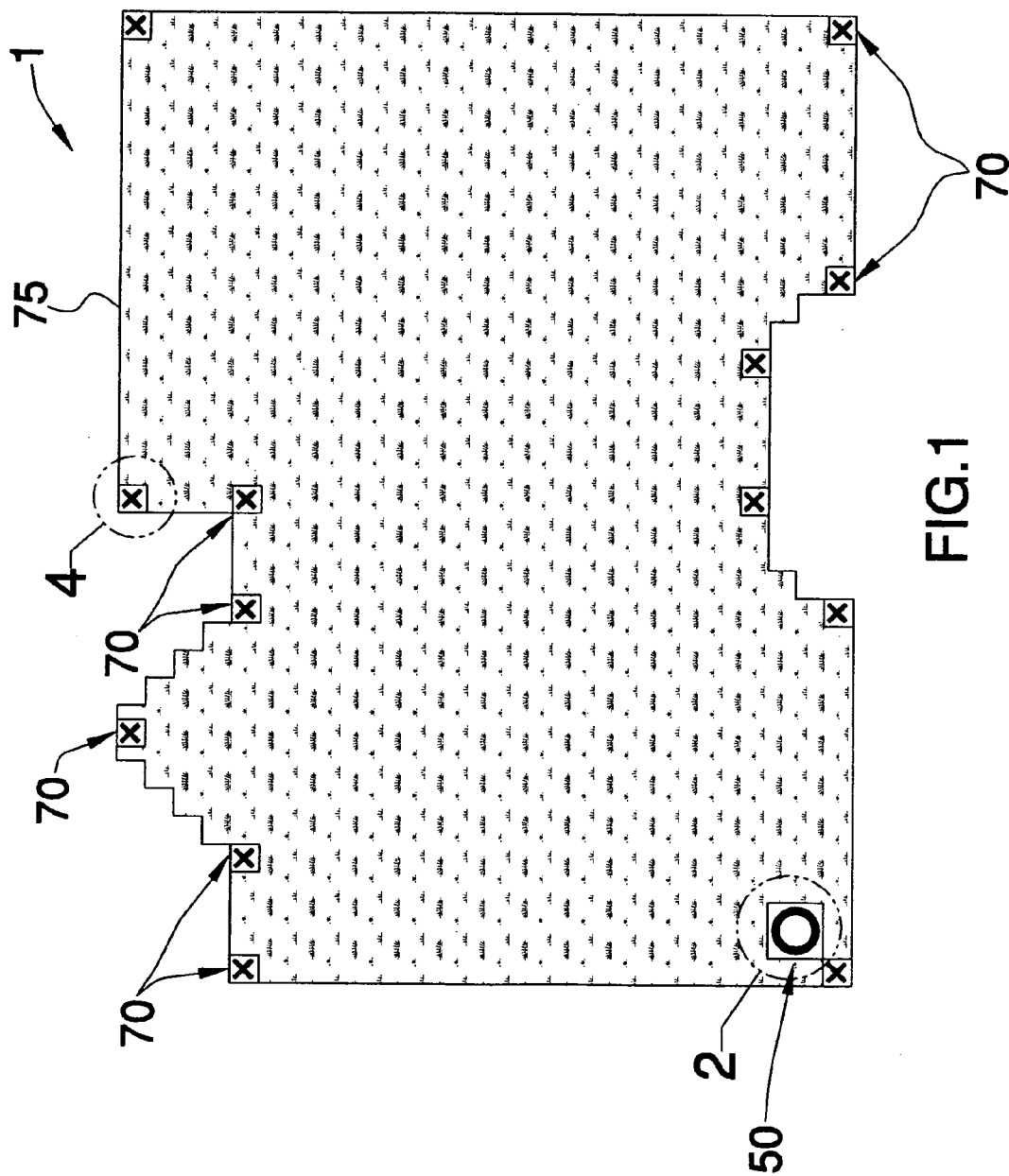
FIG. 1 is a top view of a lawn in implementation of the automated lawn cutting and vacuum system of the present invention, with multiple perimeter sensors placed around the perimeter of the lawn and a mower home base enclosure placed on the lawn for containing the automated lawnmower when not in use.

Referring to the drawings, an illustrative embodiment of the automated lawn cutting and vacuum system, hereinafter system, of the present invention is generally indicated by reference numeral 1 in FIGS. 1 and 3. Briefly, the system 1 includes an automated lawnmower 2 (FIG. 3) which is suitable for cutting grass on a lawn 75 (FIG. 1). Multiple perimeter sensors 70 are placed in spaced-apart relationship to each other around the perimeter of the lawn 75 to emit infrared beams and form a "virtual wall" which prevents the automated lawnmower 2 from straying beyond the edges of the lawn 75 in use as will be hereinafter described. The system 1 further includes a mower home base enclosure 50 in which the automated lawnmower 2 is stored and typically re-charged when not in use.

Figure 6:
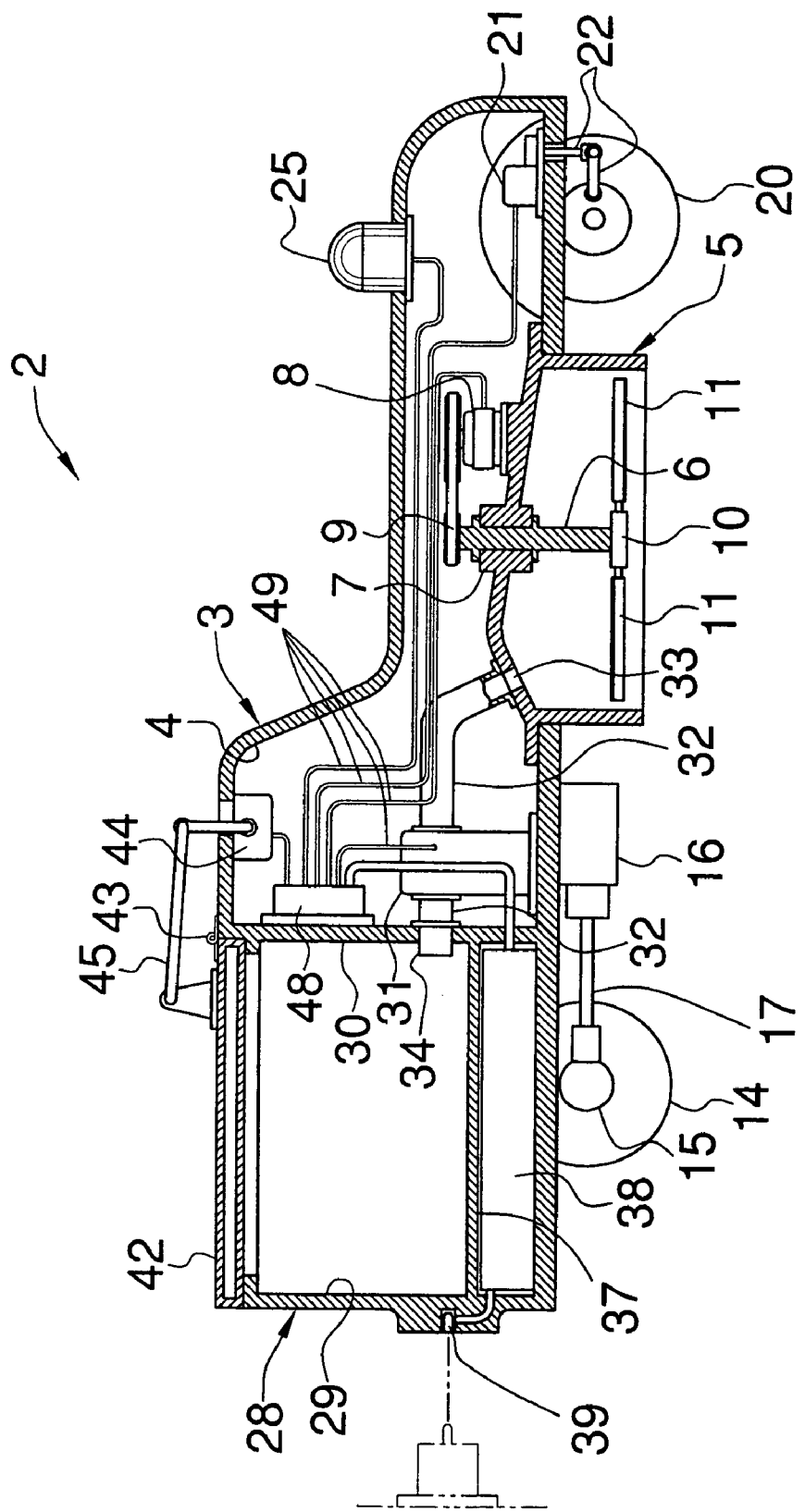
FIG. 6 is a longitudinal sectional view of the automated lawnmower.

As illustrated in FIG. 6, the automated lawnmower 2 typically includes a mower housing 3 which may be configured in the shape of an automobile, as shown, or may be any desired alternative shape. The mower housing 3 defines a housing interior 4. A storage bin 28 is provided on the rear end of the mower housing 3 and has a bin interior 29. A partition 30 separates the housing interior 4 from the bin interior 29. A storage bin lid 42 is pivotally attached to the upper surface of the mower housing 3 via hinges 43 for reversibly closing the bin interior 29. A lid opener 44 is provided in the housing interior 4 and engages the storage bin lid 42 through a linkage 45. The lid opener 44 is operable to open and close the storage bin lid 42 via the linkage 45 to remove grass clippings (not shown) from the bin interior 29, as will be hereinafter further described. A sensor detector 25, which is capable of detecting infrared signals, is provided on the front portion of the mower housing 3. The sensor detector 25 may be conventional.

The mower housing 3 is rendered portable by a pair of rear wheels 14 and a pair of front wheels 20. A rear wheel drive motor 16 provided on the bottom of the mower housing 3 engages a rear wheel drive mechanism 15, which rotates the rear wheels 14, through a linkage 17. A steering motor 21 provided in the housing interior 4 at the front end of the mower housing 3 engages the front wheels 20 through a linkage 22 to facilitate steering of the automated lawnmower 2.

A blade housing 5 is provided on the bottom of the mower housing 3 between the rear wheels 14 and the front wheels 20. A blade drive motor 8 is provided in the housing interior 4 and engages a blade shaft 6 for rotation through a drive belt 9. The blade shaft 6 is journalled for rotation in a shaft bearing 7 which is provided in the top of the blade housing 5. A blade hub 10 is provided on the lower end portion of the blade shaft 6, inside the mower housing 5, and mower blades 11 extend from the blade shaft 6.

A vacuum unit 31 is provided in the housing interior 4. A vacuum conduit 32 connects the mower housing 5 to the vacuum unit 31 and the vacuum unit 31 to the storage bin 28. The vacuum conduit 32 includes a conduit inlet 33 in the top of the mower housing 5 and a conduit outlet 34 in the bin interior 29.

A battery compartment 37 is provided typically beneath the storage bin 28 or in any other suitable location on the mower housing 3. A battery 38, which may be disposable but is preferably re-chargeable, is contained in the battery compartment 37. A battery charge port 39 is provided in the rear end of the storage bin 28 and is disposed in electrical contact with the battery 38 to facilitate re-charging of the battery 38, as will be hereinafter described.

A control panel 48 is provided in the housing interior 4, typically on the partition 30. The operational components of the automated lawnmower 2, including the blade drive motor 8, the rear wheel drive motor 16, the steering motor 21, the sensor detector 25, the battery 38 and the lid opener 44, are connected to the control panel 48 via respective electrical pathways 49. The control panel 48 includes a microprocessor (not shown) which facilitates automated operation of the operational components of the automated lawnmower 2 through programming, a radio-controlled device (not shown) and/or through control elements (not shown) provided on the mower housing 3.

Figure 2:
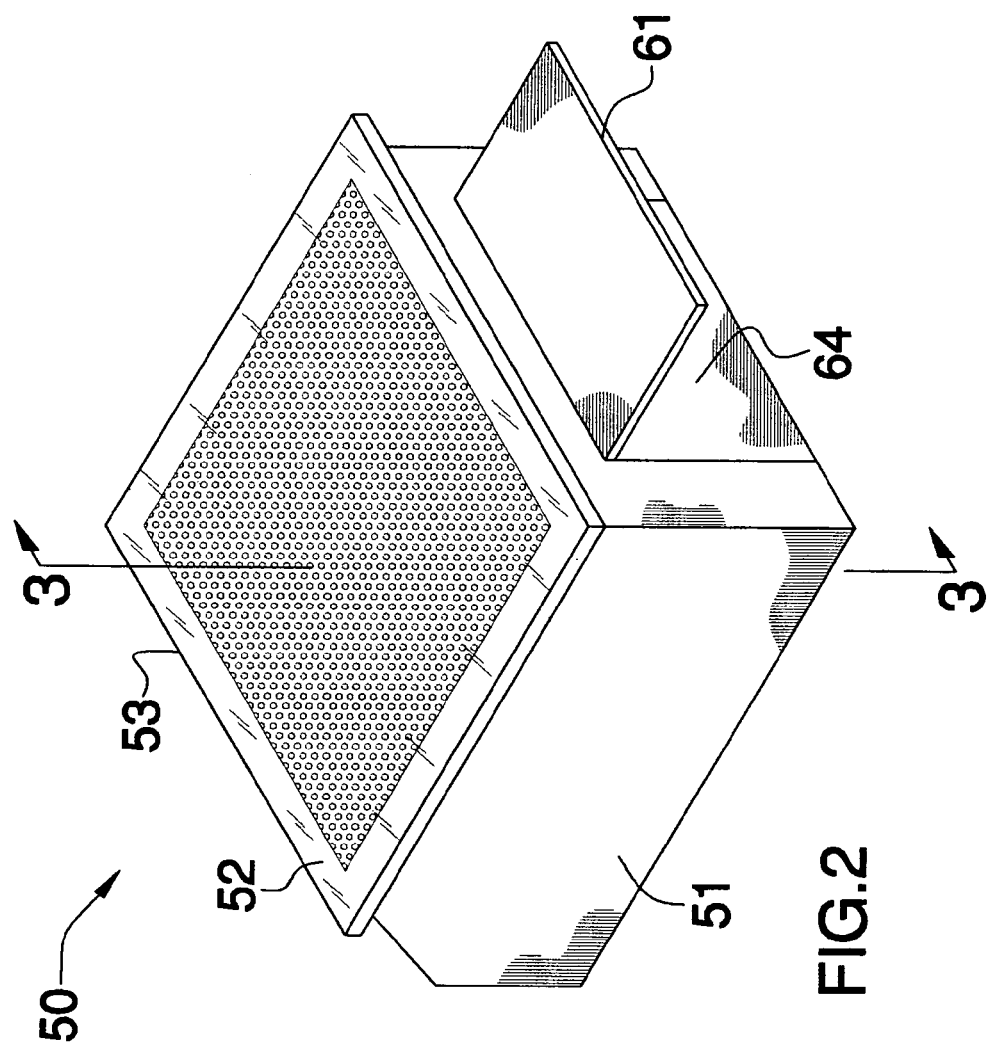
FIG. 2 is a perspective view of the mower home base enclosure with the enclosure door disposed in the open position.
Figure 3:
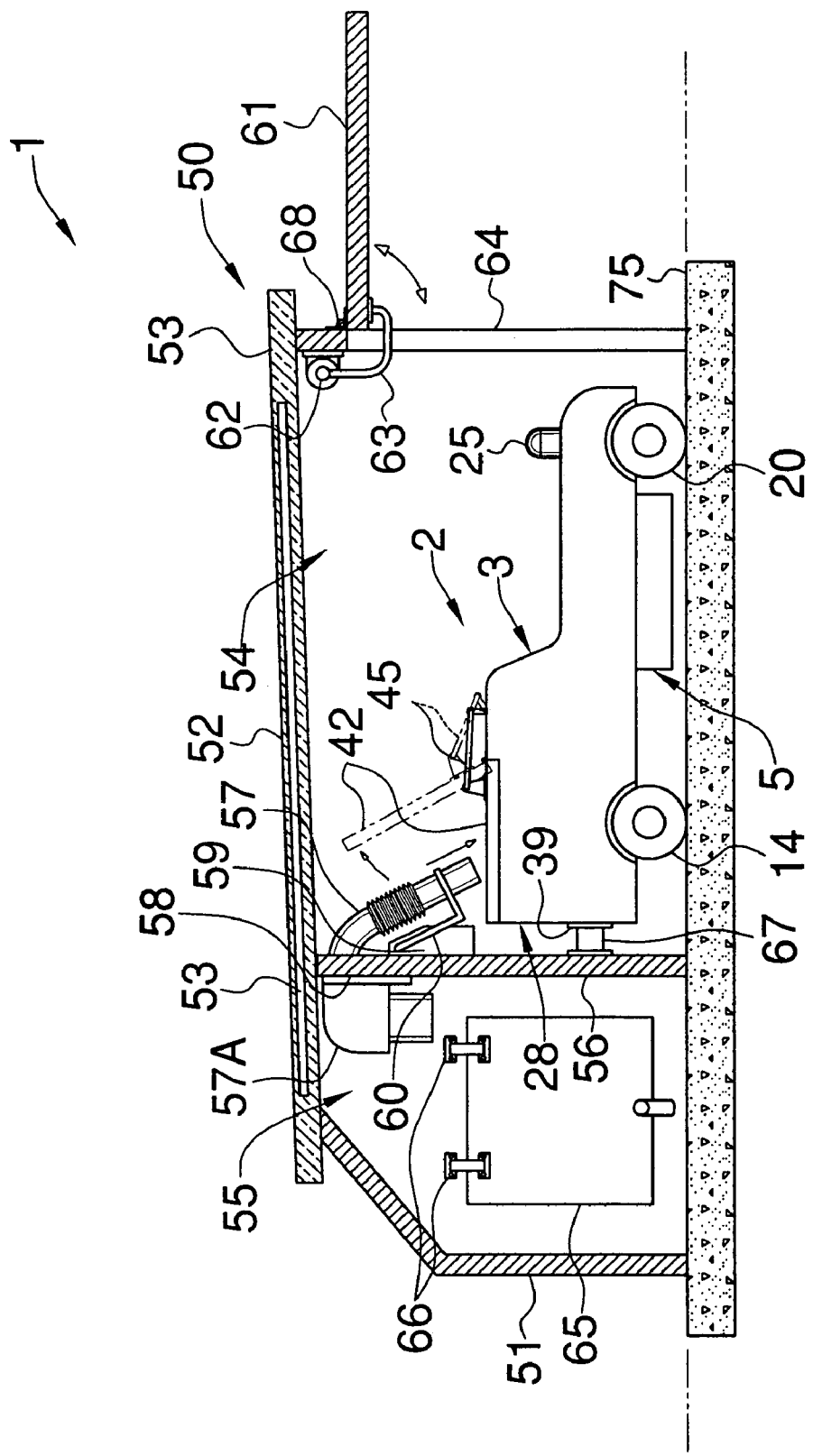
FIG. 3 is a sectional view of the mower home base enclosure with the automated lawnmower contained therein.

As illustrated in FIGS. 2 and 3, the system 1 further includes a mower home base enclosure 50 having walls 51 and a roof 52 which is typically PLEXIGLASS (trademark). A solar panel 53 is preferably provided in the roof 52 to facilitate charging the battery 38 (FIG. 6) of the automated lawnmower 2 when the automated lawnmower 2 is contained inside the mower home base enclosure 50, as will be hereinafter described. As shown in FIG. 3, a partition 56 divides the mower home base enclosure 50 into a mower compartment 54 and a storage compartment 55. A power port 67 provided on the partition 56 inside the mower compartment 54 is electrically connected to the solar panel 53 to receive solar-generated electrical current from the solar panel 53 and re-charge the battery 38 (FIG. 6) of the automated lawnmower 2 when the battery charge port 39 is plugged into the power port 67.

A door opening 64 provided in the enclosure 50 is reversibly closed by an enclosure door 61 which is pivotally attached to the enclosure 50 via hinges 68. A door motor 62 typically mounted on the interior surface of one of the walls 51 engages the enclosure door 61 through a linkage 63 to facilitate selective opening and closing of the door opening 64. A clear-out door 65 is typically mounted on the enclosure 50 via hinges 66 and normally closes a clear-out opening (not shown) through which grass clippings (not shown) can be removed from the storage compartment 55 after a grass-mowing operation.

A vacuum conduit 57 extends through the partition 56 and includes a flexible bellows portion 58 that facilitates selective lengthening and shortening of the vacuum conduit 57. An extension motor 59 is provided on the partition 56, inside the mower compartment 54, and a linkage 60 connects the extension motor 59 to the lower portion of the vacuum conduit 57. Accordingly, the extension motor 59 is capable of extending or shortening the length of the vacuum conduit 57 by expanding or contracting the flexible bellows portion 58 through the linkage 60, for purposes which will be hereinafter described. A vacuum unit 57a provided in fluid communication with the vacuum conduit 57 is mounted on the partition 56, inside the storage compartment 55.

Figure 4:
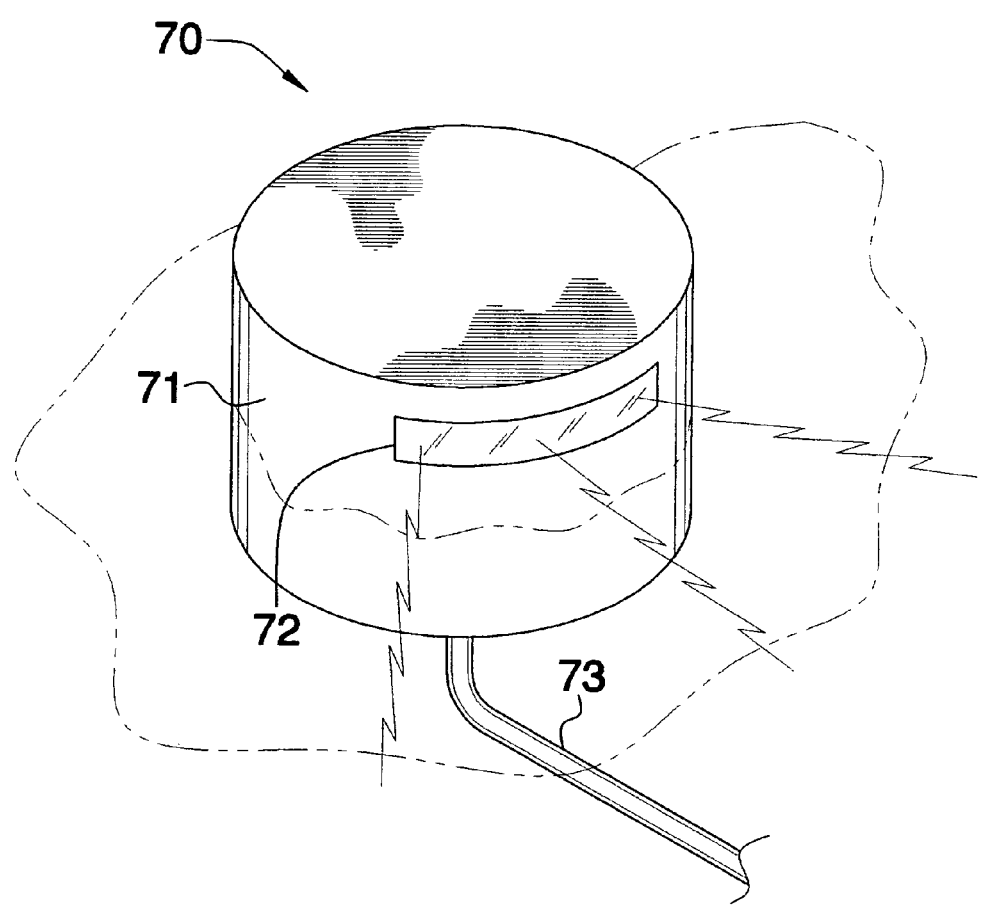
FIG. 4 is a perspective view of a perimeter sensor of the automated lawn cutting and vacuum system.
Figure 5:
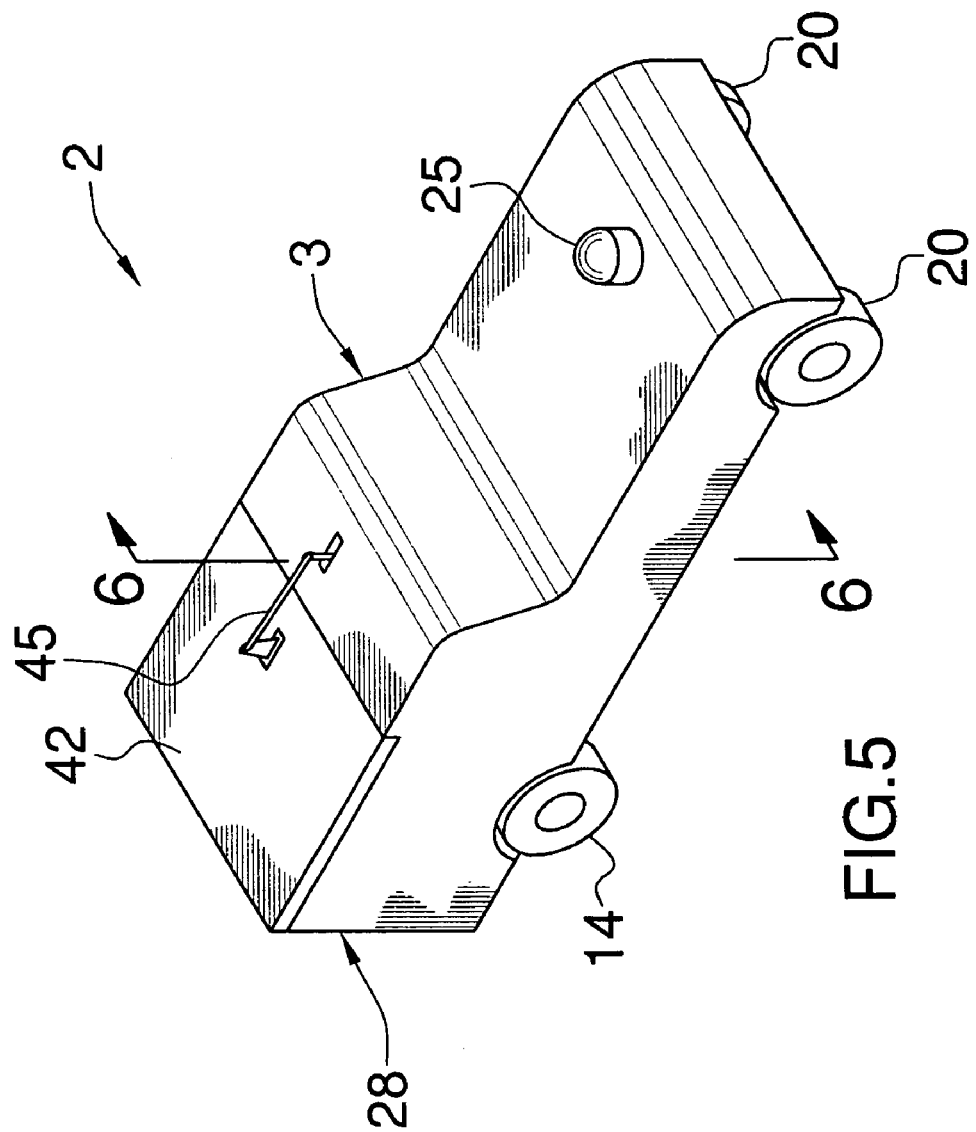
FIG. 5 is a perspective view of the automated lawnmower.

Referring next to FIG. 4, each of the perimeter sensors 70 typically includes a sensor housing 71 having an elongated slot 72. The sensor housing 71 includes interior components (not shown) which may be conventional and are capable of emitting an infrared beam (not shown) through the slot 72. The interior components are typically connected to a power cord 73 which may be fitted with a standard plug (not shown) for insertion into a standard 120-volt household electrical outlet (not shown), for example. Alternatively, the interior components may be battery-powered. The infrared beam emitted by the perimeter sensor 70 is detected by the sensor detector 25 on the automated lawnmower 2, and the sensor detector 25 prevents the automated lawnmower 2 from straying beyond the boundaries defined by the multiple perimeter sensors 70, as will be hereinafter further described.

In typical use of the system 1, multiple perimeter sensors 70 are placed at selected spacings with respect to each other along the perimeter of a lawn 75 which is to be mowed, as shown in FIG. 1. The slots 72 (FIG. 4) of adjacent perimeter sensors 70 typically face each other. The perimeter sensors 70 are operated to emit an infrared beam from the slot 72 of each to define an invisible infrared "virtual wall" between adjacent perimeter sensors 70 at the boundary of the lawn 75. When not in use, the automated lawnmower 2 is contained inside the mower compartment 54 (FIG. 3) of the mower home base enclosure 50. Accordingly, the battery charge port 39 of the automated lawnmower 2 is plugged into the power port 67 on the partition 56 of the enclosure 50. The solar panel 53 in the roof 52 of the enclosure 50 generates electrical current from sunlight and transmits this electrical current into the battery 38 (FIG. 6).

When it is desired to operate the automated lawnmower 2 to mow the lawn 75, the enclosure door 61 of the enclosure 50 is opened by operation of the door motor 62. The rear wheel motor 16 of the automated lawnmower 2, through the control panel 48, initiates rotation of the rear wheels 14, which drive the automated lawnmower 2 out of the mower compartment 54, through the door opening 64 and onto the lawn 75. Simultaneously, the control panel 48 initiates operation of the blade drive motor 8 to rotate the mower blades 11 inside the mower housing 5. The control panel 48 may be actuated by a radio-controlled device (not shown) or through control elements (not illustrated) provided directly on the mower housing 3 of the automated lawnmower 2. Alternatively, the control panel 48 may be programmed to perform the various functions of the automated lawnmower 2, according to the knowledge of those skilled in the art.

As the automated lawnmower 2 traverses the lawn 75, the rear wheels 14 cause forward motion of the automated lawnmower 2 as the mower blades 11 cut the grass on the lawn 75. The control panel 48 may randomly operate the steering motor 21 to turn the automated lawnmower 2 to the right or left and then straight to eventually cut all areas of the lawn 75. Alternatively, the control panel 48 may operate the steering motor 21 to steer the automated lawnmower 2 in a straight line followed by turning of the automated lawnmower 2 to facilitate mowing of the lawn 75 in adjacent lanes.

When the automated lawnmower 2 approaches the infrared "virtual wall" formed by adjacent perimeter sensors 70, the sensor detector 25 senses the infrared wall and relays this information to the control panel 48. In turn, the control panel 48 causes the rear wheel motor 16 to reverse rotation of the rear wheels 14 and reverse the motion of the automated lawnmower 2. Consequently, the automated lawnmower 2 is incapable of straying beyond the perimeter of the lawn 75 as defined by the infrared "virtual wall" formed by the perimeter sensors 70. As the mower blades 11 cut the grass on the lawn 75, the control panel 48 operates the vacuum unit 31 (FIG. 6) to draw cut grass clippings from the blade housing 5, through the vacuum conduit 32 and into the bin interior 29 of the storage bin 28, respectively.

After the mowing operation is completed, the automated lawnmower 2 returns to the enclosure 50 and the battery charge port 39 is docked at the power port 67, as shown in FIG. 3, to re-charge the battery 38 (FIG. 6). Guide sensors (not shown) may be provided on the enclosure 50 at the respective sides of the door opening 64 to guide the automated lawnmower 2 into the enclosure 50 via the sensor detector 25 and control panel 48. After the automated lawnmower 2 enters the enclosure 50, the control panel 48 opens the storage bin lid 42 via the lid opener 44. Next, the extension motor 59 extends or stretches the vacuum conduit 57 such that the end of the vacuum conduit 57 is extended into the bin interior 29 of the storage bin 28. Next, the vacuum unit 57a draws the grass clippings collected in the storage bin 28 from the bin interior 29, through the vacuum conduit 57 and into the storage compartment 55 (FIG. 3) until the bin interior 29 is empty. The grass clippings collected in the storage compartment 55 can be removed by opening the clear-out door 65 and removing the clippings through the clear-out opening (not shown). The extension motor 59 then retracts the vacuum conduit 57 from the bin interior 29, and the storage bin lid 42 is closed. When the battery 38 is re-charged, the automated lawnmower 2 is primed for another lawnmowing operation.

While the preferred embodiments of the invention have been described above, it will be recognized and understood that various modifications can be made in the invention and the appended claims are intended to cover all such modifications which may fall within the spirit and scope of the invention.

What is claimed is:

1. An automated lawn cutting and vacuum system comprising:
   an automated lawnmower comprising a mower housing;
   a plurality of wheels carried by said mower housing;
   a drive motor and a steering motor engaging said plurality of wheels;
   a plurality of blades rotatably carried by said mower housing;
   a blade drive motor operably engaging said plurality of blades;
   a control panel operably connected to said drive motor, said steering motor and said blade drive motor for driving and steering said automated lawnmower and rotating said plurality of blades and
   a storage bin carried by said mower housing.

2. The system of claim 1 further comprising a storage bin lid pivotally carried by said mower housing and a lid opener engaging said storage bin lid for selectively opening and closing said storage bin lid.

3. The system of claim 1 further comprising a blade housing carried by said mower housing and wherein said plurality of blades is rotatably mounted in said blade housing.

4. The system of claim 3 further comprising a vacuum conduit connecting said mower housing to said storage bin and a vacuum unit connected to said vacuum conduit.

5. The system of claim 1 further comprising a battery compartment carried by said mower housing, a battery provided in said battery compartment and a battery charge port provided in said battery compartment.

6. An automated lawn cutting and vacuum system comprising:
   an automated lawnmower comprising a mower housing;
   a plurality of wheels carried by said mower housing;
   a drive motor and a steering motor engaging said plurality of wheels;
   a plurality of blades rotatably carried by said mower housing;
   a blade drive motor operably engaging said plurality of blades;
   a control panel operably connected to said drive motor, said steering motor and said blade drive motor for driving and steering said automated lawnmower and rotating said plurality of blades;
   a storage bin carried by said mower housing;
   a vacuum conduit connecting said storage bin to said mower housing; and
   a mower home base enclosure for containing said automated mower when said automated mower is not in use.

7. The system of claim 6 wherein said mower home base enclosure comprises a plurality of walls and a roof defining an enclosure interior.

8. The system of claim 7 further comprising a solar panel carried by said roof and a power port provided in said enclosure interior and electrically connected to said solar panel.

9. The system of claim 7 further comprising a partition dividing said enclosure interior and a storage compartment and a mower compartment separated by said partition.

10. The system of claim 9 further comprising a vacuum unit provided in said storage compartment and a vacuum conduit connected to said vacuum unit and extending through said partition into said mower compartment.

11. The system of claim 10 further comprising a flexible bellows provided in said vacuum conduit and an extension motor operably engaging said flexible bellows for selectively extending and shortening said vacuum conduit.

12. The system of claim 6 further comprising a storage bin lid pivotally carried by said storage bin and a lid opener engaging said storage bin lid for selectively opening and closing said storage bin lid.

13. The system of claim 12 further comprising a blade housing carried by said mower housing and wherein said plurality of blades is rotatably mounted in said blade housing.

14. The system of claim 13 further comprising a vacuum conduit connecting said mower housing to said storage bin and a vacuum unit connected to said vacuum conduit.

15. An automated lawn cutting and vacuum system comprising:
   an automated lawnmower comprising a mower housing;
   a plurality of wheels carried by said mower housing;
   a drive motor and a steering motor engaging said plurality of wheels;
   a plurality of blades rotatably carried by said mower housing;
   a blade drive motor operably engaging said plurality of blades;
   a control panel operably connected to said drive motor, said steering motor and said blade drive motor for driving and steering said automated lawnmower and rotating said plurality of blades;
   a plurality of perimeter sensors for placement around a perimeter of a lawn and emitting beams;

a sensor detector carried by said mower housing and connected to said control panel for detecting said beams and responsively modifying control of said drive motor and said steering motor;

a storage bin carried by said mower housing and a vacuum conduit connecting said storage bin to said mower housing; and a mower home base enclosure for containing said automated mower when said automated mower is not in use.

16. The system of claim 15 wherein said mower home base enclosure comprises a mower compartment and a storage compartment.

17. The system of claim 16 further comprising a vacuum conduit connecting said storage compartment to said mower compartment and a vacuum unit connected to said vacuum conduit.

18. The system of claim 16 wherein said mower home base enclosure comprises a plurality of walls and a roof defining an enclosure interior.

19. The system of claim 18 further comprising a solar panel carried by said roof and a power port provided in said enclosure interior and electrically connected to said solar panel.

* * * * *